United States Patent [19]
Alpert et al.

[11] Patent Number: 5,493,661
[45] Date of Patent: Feb. 20, 1996

[54] METHOD AND SYSTEM FOR PROVIDING A PROGRAM CALL TO A DISPATCHABLE UNIT'S BASE SPACE

[75] Inventors: Alan I. Alpert, Hopewell Junction; Carl E. Clark, Poughkeepsie; Jeffrey A. Frey, Fishkill; Michael G. Mall, LaGrangeville, all of N.Y.

[73] Assignee: International Business Machines Corporation, Armonk, N.Y.

[21] Appl. No.: 847,555

[22] Filed: Mar. 6, 1992

[51] Int. Cl.⁶ .............................. G06F 12/10; G06F 12/00
[52] U.S. Cl. .................. 395/418; 395/419; 364/DIG. 1; 364/256.6; 364/256.4; 364/DIG. 2; 364/961.2
[58] Field of Search .................................. 395/425, 400, 395/419, 418; 364/200

[56] References Cited

U.S. PATENT DOCUMENTS

| | | | |
|---|---|---|---|
| 4,366,537 | 12/1982 | Heller et al. | 395/425 |
| 4,731,734 | 3/1988 | Gruner et al. | 395/375 |
| 4,800,489 | 1/1989 | Moyer et al. | 395/416 |
| 4,943,913 | 7/1990 | Clark | 395/700 |
| 4,945,480 | 7/1990 | Clark et al. | 395/700 |
| 4,979,098 | 12/1990 | Baum et al. | 395/400 |
| 5,023,773 | 6/1991 | Baum et al. | 395/727 |

OTHER PUBLICATIONS

Enterprise Systems Architecture/390, Principles of Operation, SA22-7201-00, IBM Corporation.

*Primary Examiner*—Tod R. Swann
*Assistant Examiner*—Reginald Bragdon
*Attorney, Agent, or Firm*—Bernard M. Goldman

[57] ABSTRACT

A method and system for providing a PROGRAM CALL to a dispatchable unit's base space is described herein. A program call to a dispatchable unit's (PC to DU) base space bit is added to each entry-table entry in order to determine whether a PROGRAM CALL to a base space is to be made. Should the bit indicate that a PROGRAM CALL to a dispatchable unit's base space is to be made, then in one embodiment, the base address space number-second-table entry origin (BASTEO) and base address space number (BASN) stored in the dispatchable unit control table (DUCT) are used in identifying the base space and accessing associated control information for the identified base space. In another embodiment, the BASN stored in the DUCT is used in ASN translation to identify the base space and access the associated control information for the base space.

20 Claims, 5 Drawing Sheets

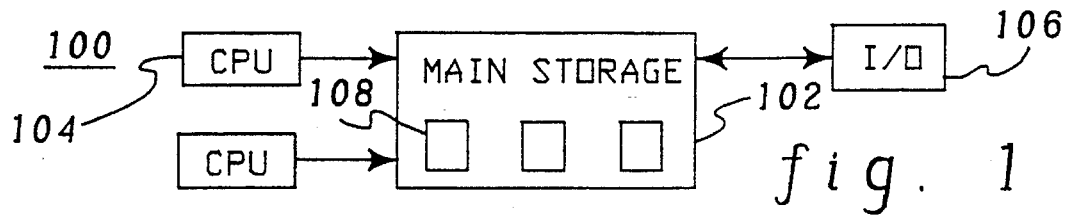
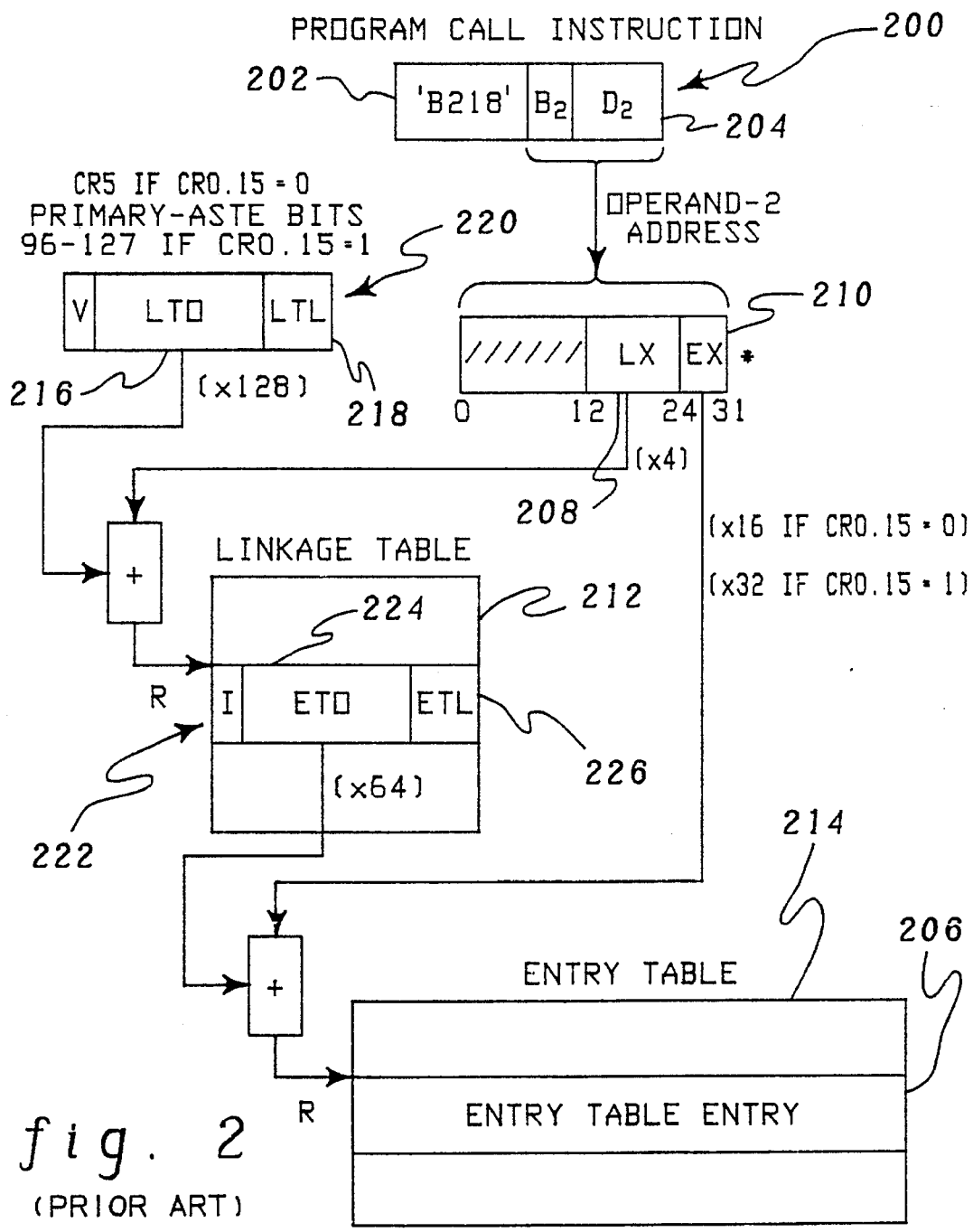
fig. 2
(PRIOR ART)
R: ADDRESS IS REAL
*: IN STACKING PC, PC NUMBER IS PLACED LINKAGE STACK

METHOD AND SYSTEM FOR PROVIDING A PROGRAM CALL TO A DISPATCHABLE UNIT' S BASE SPACE

TECHNICAL FIELD

This invention relates, in general, to virtual address spaces within a data processing system, and, in particular, to a PROGRAM CALL instruction which can be issued from an address space to a base address space while executing under a dispatchable unit of the base address space.

BACKGROUND ART

Data processing systems which use virtual addressing in multiple virtual address spaces are well known and include systems such as, for instance, the IBM System/390 using MVS controlled programming. The organization and hardware/architectural aspects of the IBM System/390 are described in "IBM System/390 Principles of Operation," Form No. SA22-7201-00. The MVS system, as well as many other data processing systems, includes, for example, a central processing unit (CPU) and a main storage. The CPU contains the sequencing and processing facilities for instruction execution, interruption action, timing functions, initial program loading and other machine related functions. The main storage is directly addressable and provides for high-speed processing of data by the CPU. The main storage may be either physically integrated with the CPU or constructed in stand-alone units.

In general, address spaces reside in main storage wherein an address space is a consecutive sequence of integer numbers (or virtual addresses), together with the specific transformation parameters which allow each number to be associated with a byte location in storage. The sequence starts at zero and proceeds left to right.

When a virtual address is used by a CPU to access main storage, it is first converted, by means of dynamic address translation (DAT), to a real address, and then, by means of prefixing, to an absolute address. DAT uses two levels of tables (segment tables and page tables) as transformation parameters. The designation (origin and length) of a segment table is found for use by DAT in a control register or as specified by an access register.

DAT uses, at different times, the segment-table designations in different control registers or specified by the access registers. The choice is determined by the translation mode specified in the current program-status word (PSW). Four translation modes are available: primary-space mode, secondary-space mode, access-register mode (AR-mode), and home-space mode. Different address spaces are addressable depending on the translation mode.

At any instant when the CPU is in the primary-space mode or secondary-space mode, the CPU can translate virtual addresses belonging to two address spaces—the primary address space and the secondary address space. At any instant when the CPU is in the access-register mode, it can translate virtual addresses of up to 16 address spaces— the primary address space and up to 15 AR-specified address spaces. At any instant when the CPU is in the home-space mode, it can translate virtual addresses of the home address space.

The primary address space is identified as such because it consists of primary virtual addresses, which are translated by means of the primary segment-table designation. Similarly, the secondary address space consists of secondary virtual addresses translated by means of the secondary segment-table designation, the AR-specified address spaces consist of AR-specified virtual addresses translated by means of AR-specified segment-table designations, and the home address space consists of home virtual addresses translated by means of the home segment-table designation. The primary and secondary segment-table designations are in control registers 1 and 7, respectively. The AR-specified segment-table designations are in control registers 1 and 7 and in table entries called ASN-second-table entries. The home segment-table designation is in control register 13.

Access register mode is described in U.S. Pat. No. 5,023,773 entitled "Authorization for Selective Program Access to Data and Multiple Address Spaces" issued on Jun. 11, 1991 and assigned to International Business Machines Corp. Described within the patent is a program authorization mechanism for authorizing access to an address space in the main memory of a computer system by a program being run under a multiple address space facility. The multiple address space facility provides 16 32-bit access registers and when operating in access register mode, one of the access registers is used to specify the address space to which the logical address is relative by specifying a segment-table designation used by DAT to translate the logical address for the address space.

A program can cause different address spaces to be addressable by using, for example, the semiprivileged SET ADDRESS SPACE CONTROL instruction to change the translation mode to the primary-space mode, or home-space mode. However, SET ADDRESS SPACE CONTROL can set the home-space mode only in the supervisor state. The program can cause still other address spaces to be addressable by using other semiprivileged instructions to change the segment-table designations in control registers 1 and 7 and by using unprivileged instructions to change the contents of the access registers. Only the privileged LOAD CONTROL instruction is available for changing the home segment-table designation in control register 13.

The home address space facility is described in U.S. Pat. No. 4,943,913, entitled "Operating System Accessing Control Blocks By Using Home Address Space Segment Table To Control Instruction And Operand Fetch and Store Operations" issued on Jul. 24, 1990 and assigned to International Business Machines Corp. In particular, a method for providing a way for the operating system to access instructions and data in a multiple address space environment is described. The method includes the steps of dispatching the highest priority address space with a dispatchable unit of work as a home address space which contains control blocks for defining the dispatchable unit of work, loading a pointer to a segment table for the home address space in one of the control registers to provide for virtual address translation in the home address space, setting address space control bits in a field of the program status word in the CPU thereby identifying a home mode and causing the home address space segment table to be the one to be used by DAT to translate virtual addresses and data in the home address space, and accessing the control blocks by the operating system using the home address space segment table to predictably control instruction and operand fetch and store operations from and to the home address space for the dispatchable unit of work in the home address space.

An address space may be assigned an address space number (ASN) by the control program. The ASN designates, within a two-level table structure in main storage, an ASN-second-table entry containing information about the address space. If the ASN-second-table entry is marked as valid, it contains the segment-table designation that defines the address space.

Under certain circumstances, the semiprivileged instructions which place a new segment-table designation in control register 1 or 7 fetch this segment-table designation from an ASN-second-table entry. Some of these instructions use an ASN-translation mechanism which, given an ASN, can locate the designated ASN-second-table entry.

The ASNs for the primary and secondary address spaces are assigned positions in control registers. The ASN for the primary address space, called the primary ASN, is assigned bits 16-31 of control register 4, and that for the secondary address space, called secondary ASN, is assigned bits 16-31 of control register 3.

Address spaces may be used to provide degrees of isolation between users. There can be a completely different address space for each user, thus providing complete isolation, or there can be a shared area which is provided by mapping a portion of each address space to a single common storage area. In addition, one program in one address space can access data or call a program in another address space (referred to as cross-memory mode), as described in U.S. Pat. No. 4,366,537 issued on Dec. 28, 1982 and assigned to International Business Machines Corp.

In U.S. Pat. No. 4,366,537 entitled "Authorization Mechanism for Transfer of Program Control or Data Between Different Address Spaces Having Different Storage Protect Keys", the use of storage protect key masks and the provision of basic authority control with dual address space memory references, program subsystem linkages and address space number translation to main memory addresses with authorization control is described. The ability to move information from a primary address space to a secondary address space includes a secondary-segment table, which is defined by a secondary-segment table origin and secondary-segment table length. An instruction, MOVE TO SECONDARY, is used in moving data between the primary address space and the secondary address space.

The order in which instructions are executed in an address space is controlled by a program status word (PSW). The PSW further indicates the status of the system in relation to the program currently being executed. Each processor has only one current PSW.

The current PSW is the hardware information in the CPU that indicates the next instruction to be executed. It also indicates whether the CPU is enabled or disabled for I/O interruptions, external interruptions, machine check interruptions and certain program interruptions. When the CPU is enabled, these interruptions can occur. When the CPU is disabled, these interruptions are ignored and remain pending. (A pending interruption is processed when the unit of work that is executing in the disable state enables.)

A task control block (TCB) is a dispatchable unit of work represented by control blocks which represent tasks executing within an address space. The tasks may include, for instance, user programs and system programs executed to support the user programs. TCBs are created in response to an ATTACH macro instruction. By issuing ATTACH, a user or system routine causes the supervisor to begin the execution of the program specified on the ATTACH macro as a subtask of the caller's task. As a subtask, the specified program can compete for CPU time and may use certain resources already allocated to the caller's task.

The TCB is used to maintain CPU status of a process (program) that has been preempted and is not currently executing on the CPU. Typical CPU status would include the general purpose registers (GPRs), the PSW, the primary ASN (PASN) and the secondary ASN (SASN) discussed below.

The PASN can be loaded by means of a PROGRAM CALL with space switching, a PROGRAM TRANSFER with space switching, PROGRAM RETURN or a LOAD ADDRESS SPACE PARAMETERS instruction. When the PASN is loaded by means of the above instructions, the corresponding segment table designator (STD) is placed in the primary segment table designator (PSTD), bits 0-31 of control register 1. The PASN can also be loaded by means of LOAD CONTROL, in which case no translation occurs to convert the PASN to STD.

When the SASN is loaded by means of the above instructions, the corresponding STD is placed in the secondary segment table designation (SSTD), bits 0-31 of control register 7. SASN can be loaded by means of LOAD CONTROL, in which case no translation occurs to convert the SASN to STD.

While the prior art describes methods for allowing programs running in one address space to PROGRAM CALL to another address space (cross-memory mode), the prior art does not allow MVS services, such as SUPERVISOR CALL instructions, to be executed in cross-memory mode. In addition, there is no facility for allowing an address space to PROGRAM CALL to the home address space while executing under the dispatchable unit of the home space. Further, the prior art, in particular the home address space facility, is restricted to priviledged programs that must reside in common storage and again most MVS services are unavailable in this mode. In addition, the prior art does not allow for a PROGRAM CALL to the home space when all the callers associated with the PROGRAM CALL are unknown.

Therefore, a need exists for providing a PROGRAM CALL to a dispatchable unit's base space in which the restrictions associated with the prior art and cross-memory mode are eliminated. Further, a need exists for a fast mechanism for leaving the cross memory environment thereby enabling access to the MVS services, (such as ENQ, OPEN, SVC, etc.). A further need exists for allowing unauthorized callers access to the base address space. A further need exists for a mechanism which readily provides access to both code and data in the base address space. In addition, a need exists for a mechanism which enables cross memory servers to run user exits in the home or base address space and exploit the ESA linkage stack via Stacking PC (e.g., to restore user authority) without requiring the cross memory server to have prior knowledge of all its callers.

DISCLOSURE OF INVENTION

The shortcomings of the prior art are overcome and additional advantages are provided in accordance with the principles of the present invention through the provision of a method and system for providing a PROGRAM CALL to a dispatchable unit's base space.

In accordance with the principles of the present invention, a method for accessing a base address space from another address space is provided. The method includes checking an indicator located by a PROGRAM CALL instruction to determine whether the base address space is to be accessed. When the indicator indicates that the base space is to be accessed, retrieving one or more parameters from a control table for use in defining the base space to be accessed and using the retrieved one or more parameters to identify the base space and access associated control information for the identified base space.

In one embodiment, the parameters are retrieved from a dispatchable unit control table and include a base address space number-second-table entry origin and a base address space number.

In yet another aspect of the invention, a system for accessing a base address space from another address space is provided. The system includes means for checking an indicator located by a PROGRAM CALL instruction to determine whether the base address space is to be accessed. When the indicator indicates that the base address space is to be accessed, means are provided for retrieving one or more parameters from a control table for use in defining the base space to be accessed and using the one or more retrieved parameters to identify the base space and access associated control information for the identified base address space.

The method and system of the present invention for providing a PROGRAM CALL to a dispatchable unit's base space provides for a fast mechanism for leaving the cross memory environment thereby enabling access to MVS services. In addition, it allows unauthorized callers access to their home address space and it allows easy access to both code and data in the base address space. The method and system described herein further enables cross memory servers to run user exits in the home address space and exploit the ESA linkage stack via a stacking PC without requiring the cross memory server to have prior knowledge of all its callers. The method and system described herein supports any depth of cross memory mode nesting.

BRIEF DESCRIPTION OF DRAWINGS

The subject matter which is regarded as the invention is particularly pointed out and distinctly claimed in the claims at the conclusion of the specification. The invention, however, may best be understood by reference to the following detailed description taken in conjunction with the accompanying drawings in which:

FIG. 1 depicts one example of a block diagram of the hardware components of a system for providing a PROGRAM CALL to a dispatchable unit's base space, in accordance with the principles of the present invention;

FIG. 2 depicts one example of a logic flow diagram of the PC number translation operation of a PROGRAM CALL instruction;

BEST MODE FOR CARRYING OUT THE INVENTION

Figure 3:
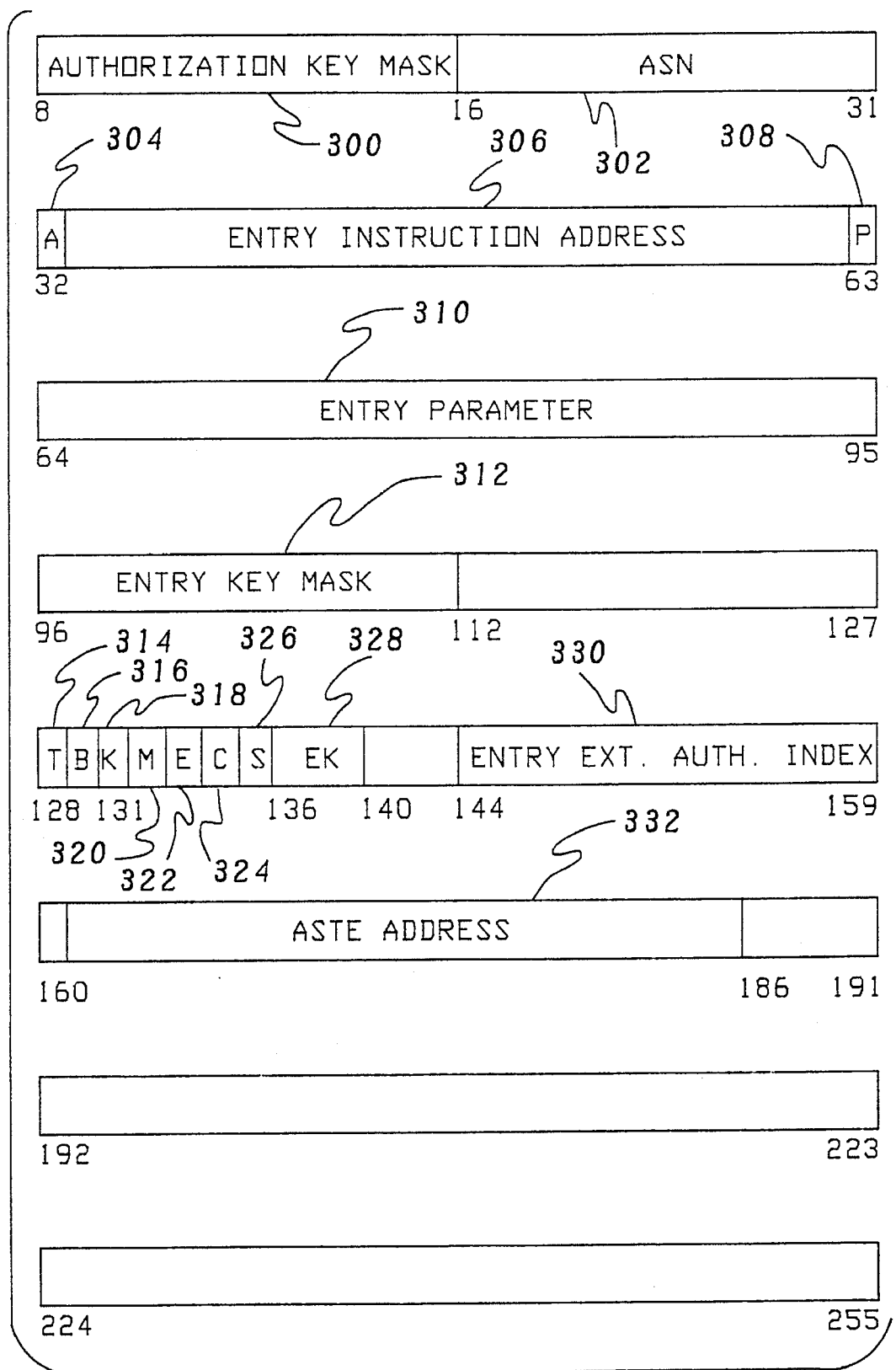
FIG. 3 depicts one embodiment of a 32-byte entry table entry, in accordance with the principles of the present invention.

One example of the hardware components associated with a method and system for providing a PROGRAM CALL to a dispatchable unit's base space in accordance with the principles of the present invention, is depicted in FIG. 1. As shown in FIG. 1, system 100 includes, for instance, a main storage 102, one or more central processing units (CPUs) 104 and one or more input/output (I/O) devices 106.

In general, input devices 106 are used to load data and/or programs into main storage 102, and central processing units 104 are used to access the stored programs or data from main storage. As previously described, main storage 102 includes one or more address spaces 108, wherein an address space is a consecutive sequence of integer numbers (or virtual addresses), together with the specific transformation parameters which allow each number to be associated with a byte location in storage. Typically, an entire virtual address space 108 is not resident within main storage. Instead, only that portion associated with a program or data being accessed or used by one or more of the processors is resident within the main storage.

An address space containing a currently dispatched task control block (TCB) or dispatchable unit is referred to herein as a base address space or base space. In the current implementation of the International Business Machines Multiple Virtual Storage (MVS) operating system, the base space is equivalent to the home address space (home space) which is described in detail in IBM *Enterprise Systems Architecture*/390, Principles of Operation (SA22-7201-00). However, in other operating systems, the base space can be distinct from the home space.

While a program associated with a dispatchable unit (or TCB) is executing, it may issue a PROGRAM CALL instruction (PC), which provides a protected mechanism for transferring control between programs operating at different levels, or the same level, of control. A PROGRAM CALL by a program in one address space to a program in another address space is called a PROGRAM CALL with space switching (PC-ss) operation (when this occurs, the system is operating in cross-memory mode). A PROGRAM CALL to a program in the same address space with no space switching is called a PROGRAM CALL to current primary (PC-cp) operation.

The PC-ss operation allows a chain of program calls to occur. That is, for example, a program running under a dispatchable unit of the base space issues a PROGRAM CALL to a program in another address space, for instance, Address Space A. Then, while still executing under the control of the same dispatchable unit, the program in Address Space A issues a PROGRAM CALL to a program in Address Space B and so on. In accordance with the principles of the present invention, during a PC-ss operation, a PROGRAM CALL can also be issued from any one of the address spaces to the base space while executing under the same dispatchable unit of the base space. As mentioned, this PROGRAM CALL to the base space can occur anywhere within the chain of calls and it can occur without the program issuing the call knowing where it was called from. That is, if a program in Address Space B issued the PROGRAM CALL to base space, it need not know that it was called by a program in Address Space A which was initially called by a program in the base space.

Referring to FIG. 2, a PROGRAM CALL instruction 200 includes an opcode 202 and a second-operand address (operand-2 address) 204. Address 204 is typically 31 bits in length and the rightmost 20 bits are referred to as a PROGRAM CALL (PC) number. The PC number is translated during the execution of the PROGRAM CALL instruction to locate an entry-table entry (ETE) 206. During translation, the 20-bit PC number is divided into two fields, a linkage index (LX) 208 and an entry index (EX) 210. Linkage index 208 is an index to a linkage table 212 and is represented by the leftmost twelve bits of the PC number, and entry index 210 is an index to an entry table 214 and is represented by the rightmost eight bits of the PC number. Linkage table 212 and entry table 214 are system control tables which reside in main storage 102. An origin (LTO) 216 and length (LTL) 218 of linkage table 212 are specified by a linkage-table designation 220 in control register 5 or the primary ASN-second-table entry (primary ASTE) (the origin of the primary ASTE is in control register 5). That is, when an address space function (ASF) control (bit 15 of control register 0) is 0, the linkage-table designation is obtained from control register 5 and when ASF is 1, the linkage-table designation is obtained from bytes 12-15 (bits 96-127) of the primary ASTE.

Linkage-index 208 is used in conjunction with linkage-table origin 216 to select an entry 222 from linkage table 212. In particular, the 31-bit real address of linkage-table entry 222 is obtained by appending seven zeros on the right to the contents of linkage-table origin 216 and adding linkage index 208, with two rightmost and seventeen leftmost zeros appended. Any carry into bit position 0 is ignored.

Subsequent to selecting linkage-table entry 222, an entry-table origin (ETO) 224 located within linkage-table entry 222 is used in conjunction with entry index 210 to select entry 206 from entry table 214. In particular, the 31-bit real address of entry-table entry 206 is obtained by appending six zeros on the right to entry-table origin 224 and adding entry index 210, with five rightmost and eighteen leftmost zeros appended. A carry, if any, into bit position 0 is ignored.

In accordance with the principles of the present invention, in one embodiment, ASF is 1 and thus, a 32-byte entry-table entry is used, as explained below, in providing a PROGRAM CALL to a dispatchable unit's base space. (When ASF is 0, each entry-table entry is 16 bytes.) One example of a 32-byte entry-table entry is depicted in FIG. 3. Many of the bits (fields) associated with the entry-table entry are known and therefore, will only be explained briefly. However, bit 129, the "B" bit has been added to the entry-table entry in accordance with the principles of the present invention and therefore, will be explained in detail further below.

Referring to FIG. 3, in accordance with the present invention, the fields of the entry-table entry include:

(a) An Authorization Key Mask 300: Bits 0-15 are used to verify whether the program issuing the PROGRAM CALL instruction, when in the problem state, is authorized to call this entry point. The authorization key mask and the current program status word (PSW) key mask in control register 3 are ANDed, and the result is checked for all zeros. If the result is all zeros, a privileged-operation exception is recognized. The test is not performed in the supervisor state.

(b) An Address Space Number (ASN) 302: Bits 16-31 specify whether a PROGRAM CALL switching state or PROGRAM CALL current primary is to occur. When bits 16-31 are all zeros, a PC-cp is specified. When bits 16-31 are not all zeros, a PC-ss is specified, and the bits are the ASN that replaces the primary ASN.

(c) Entry Addressing Mode (A) 304: Bit 32 replaces the addressing-mode bit, bit 32 of the current PSW, as part of the PROGRAM CALL operation. When bit 32 is zero, bits 33-39 must also be zeros; otherwise, a PC-translation-specification exception is recognized.

(d) Entry Instruction Address 306: Bits 33-62 with a zero appended on the right, form the instruction address that replaces the instruction address in the PSW as part of the PROGRAM CALL operation.

(e) Entry Problem State (P) 308: Bit 63 replaces the problem-state bit, bit 15 of the current PSW, as part of the PROGRAM CALL operation.

(f) Entry Parameter 310: Bits 64-95 are placed in general register 4 as part of the PROGRAM CALL operation.

(g) Entry Key Mask 312: Bits 96-111 are ORed into the PSW-key mask in control register 3 when bit 132, the PSW-key-mask is zero, or replace the PSW-key mask in control register 3 when bit 132 is one, as part of the stacking PROGRAM CALL operation. Bits 96-111 are ORed into the PSW-key mask as part of the basic PROGRAM CALL operation.

(h) PC-Type Bit (T) 314: Bit 128, when one, specifies that the PROGRAM CALL instruction is to perform a stacking PROGRAM CALL operation. A stacking PROGRAM CALL operation can link programs residing in different address spaces and having different levels of authority. In the preferred embodiment of the present invention, the PROGRAM CALL to the base space is a stacking PROGRAM CALL and thus, T=1.

When the PC-type bit is zero, the PROGRAM CALL instruction performs a basic PROGRAM CALL operation.

(i) PC to DU Base Space Bit (B) 316: Bit 129, has been added to the entry-table entry in accordance with the principles of the present invention to indicate whether a PROGRAM CALL to a base space is to be performed. Assuming bit 129 is equal to zero, then a PROGRAM CALL to the dispatchable unit's base space is not to take place. However, if bit 129 is equal to 1, then a PROGRAM CALL to a dispatchable unit's base space may take place and the base space along with its associated control information is identified in accordance with the present invention, as described further below. In one preferred embodiment, bit 316 is valid only if the issued PROGRAM CALL is a stacking PROGRAM CALL and, thus, T bit 314 equals 1.

Control program services can be provided to set the B bit in ETE 206. The manner in which bits are set are known. For example, in MVS the control program uses ETDEF and ETCRE macros to set the bit.

(j) PSW-Key Control (K) 318: Bit 131, when one, specifies that bits 136-139 are to replace the PSW key in the PSW as part of the stacking PROGRAM CALL operation. When this bit is zero, the PSW key remains unchanged. Bit 131 is ignored during the basic PROGRAM CALL operation.

(k) PSW-Key-Mask Control (M) 320: Bit 132, when one, specifies that bits 96-111 are to replace the PSW-key mask in control register 3 as part of the stacking PROGRAM CALL operation. When this bit is zero, bits 96-111 are ORed into the PSW-key mask in control register 3 as part of the stacking PROGRAM CALL operation. Bit 132 is ignored during the basic PROGRAM CALL operation.

(l) Extended-Authorization-Index Control (E) 322: Bit 133, when one, specifies that bits 144-159 are to replace the current extended authorization index in control register 8 as part of the stacking PROGRAM CALL operation. When this bit is zero, the current extended authorization index remains unchanged. Bit 133 is ignored during the basic PROGRAM CALL operation.

(m) Address-Space-Control Control (C) 324: Bit 134, when one, specifies that bit 17 of the current PSW is to be set to one as part of the stacking PROGRAM CALL operation. When this bit is zero, bit 17 is set to zero. Because the CPU must be in either the primary-space mode or the access-register mode when a stacking PROGRAM CALL instruction is issued, the result is that the CPU is placed in the access-register mode if bit 134 is one or the primary-space mode if bit 134 is zero. Bit 134 is ignored during the basic PROGRAM CALL operation.

(n) Secondary-ASN Control (S) 326: Bit 135, when one, specifies that bits 16-31 are to become the new secondary ASN, and the new SSTD is to be set equal to the new PSTD, as part of the stacking PROGRAM CALL with space switching (PC-ss) operation. When this bit is zero, the new SASN and SSTD are set equal to the PASN and PSTD, respectively, of the calling program. Bit 135 is ignored during the basic PROGRAM CALL operation and the stacking PROGRAM CALL to-current-primary (PC-cp operation.

(o) Entry Key (EK) 328: Bits 136-139 replace the PSW key in the PSW as part of the stacking PROGRAM CALL operation if the PSW-key control, bit 131, is one. Bits 136-139 are ignored and the current PSW key remains unchanged if bit 131 is zero. Bits 136-139 are ignored during the basic PROGRAM CALL operation.

(p) Entry Extended Authorization Index 330: Bits 144-159 replace the current extended authorization index, bits 0-15 of control register 8, as part of the stacking PROGRAM CALL operation if the extended-authorization-index control, bit 133, is one. Bits 144-159 are ignored and the current extended authorization index remains unchanged if bit 133 is zero. Bits 144-159 are ignored during the basic PROGRAM CALL operation.

(q) ASTE Address 332: When bits 16-31 are not all zeros, bits 161-185, with six zeros appended on the right, form the real ASN-second-table-entry (ASTE) address that should result from applying the ASN translation process to bits 16-31. It is unpredictable whether PC-ss uses bits 161-185 or uses ASN translation to obtain the ASTE address.

Bits 33-39 must be zeros when bit 32 is zero; otherwise, a PC-translation-specification exception is recognized.

At this point, the discussion returns to the execution of a PROGRAM CALL instruction from an address space to the base space, in accordance with the principles of the present invention. As described previously with reference to FIG. 2, during PROGRAM CALL execution, a PC-number translation is executed in order to access an entry in the entry table which corresponds to the second operand address of the PROGRAM CALL instruction. Subsequent to performing the PC-number translation, execution of the PROGRAM CALL continues.

Figure 4:
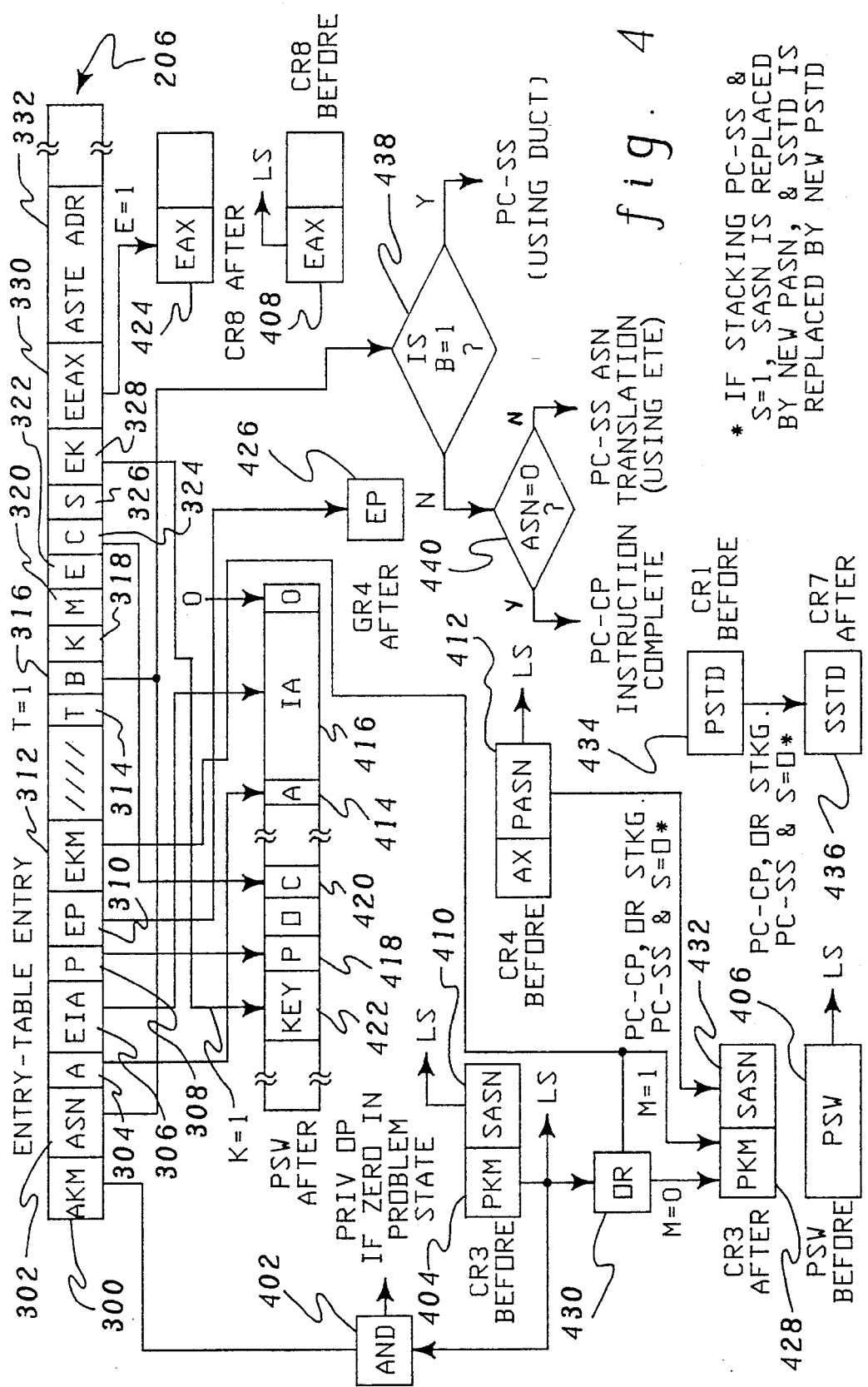
FIG. 4 is one example of a flow diagram of a stacking PROGRAM CALL instruction, in accordance with the principles of the present invention.

Referring to FIG. 4, the steps which are executed in addition to those shown in FIG. 2 for performing a stacking PROGRAM CALL to current primary (PC-cp) and a stacking PROGRAM CALL with space switching(PC-ss) is described. As previously discussed, if T bit 314 (bit 128 of ETE 206) is equal to 1, a stacking operation is to be conducted. The value of AKM 300 is ANDed at 402 with a PSW key mask (PKM) 404 in control register 3, as it existed before the execution of the PROGRAM CALL instruction. If the result of the ANDing operation at 402 gives all zeros and the program is in the problem state, the PROGRAM CALL instruction is not authorized to enter at this point, and the PROGRAM CALL operation is terminated. On the other hand, should any one of the bits match in the ANDing operation of 402 or the program is in the supervisor state, the program is authorized to make the PROGRAM CALL at this entry, and the operation continues.

If the PROGRAM CALL is authorized, a PSW at 406, an EAX at 408, PKM 404, a SASN 410, and a PASN 412 as they all existed before the PROGRAM CALL are placed on the linkage stack. Also placed on the linkage stack, but not shown, are the contents of the general registers, the contents of the access registers, and the PC number. Addressing mode bit A 304 and entry instruction address 306 are placed in the PSW at 414 and 416, respectively. Similarly, P bit 308 and C bit 324 of ETE 206 are placed in the PSW at 418 and 420, respectively. If K bit 318 is equal to 1, entry key (EK) 328 of ETE 206 is placed in the key of the PSW at 422. If E bit 322 is equal to 1, entry EAX (EEAX) 330 is placed in control register 8 at 424. Entry parameter (EP) 310 is placed in general register 4 at 426. If M bit 320 of ETE 206 is equal to 1, entry key mask (EKM) 312 replaces the PKM at 428 in control register 3. If, however, M bit 320 is equal to 0, EKM 312 is ORed into the PKM of control register 3 by an ORing operation 430. If a PC-cp operation is being executed or a stacking PC-ss is being conducted and S bit 326 is equal to 0, the PASN at 412 replaces the SASN at 432 in control register 3, and a PSTD at 434 in control register 1 replaces a SSTD 436 in control register 7. If a stacking PC-ss is being conducted and the S bit is equal to 1, SASN 432 in control register 3 is replaced by the new PASN and the SSTD in control register 7 is replaced by the new PSTD.

In accordance with the principles of the present invention, a determination is made as to whether the PC to DU base space bit 316 is equal to 1, see INQUIRY "Is B=1?" at Reference No. 438. If the PC to DU base space bit is not equal to 1, then execution of the stacking PROGRAM CALL to current primary or the stacking PROGRAM CALL with space switching is continued by testing ASN 302 of ETE 206, INQUIRY 440 "ASN=0?". If ASN 302 is equal to 0, a PC-cp operation is being conducted and at this point is complete. If, however, ASN 302 is not equal to 0, a PC-ss operation is being conducted, and in order to complete this PROGRAM CALL execution, relevant information contained in an address space number-second table-entry (ASTE) is obtained and used in defining the address space which is the target of the PROGRAM CALL instruction. The ASTE is located by either performing ASN translation for PC-ss using ASN 302 of ETE 206 or by using the ASTE address located in ETE 206.

Returning to INQUIRY 438 "Is B=1?", if PC to DU base space bit 316 resident in entry-table entry 206 is equal to 1, then in accordance with the principles of the present invention, the executing PROGRAM CALL instruction is a PROGRAM CALL from an address space to a base space under the currently executing dispatchable unit of the base space. In order to complete the PROGRAM CALL to the base space, the base space needs to be identified and the control information associated with the base space needs to be located and accessed.

Figure 5:
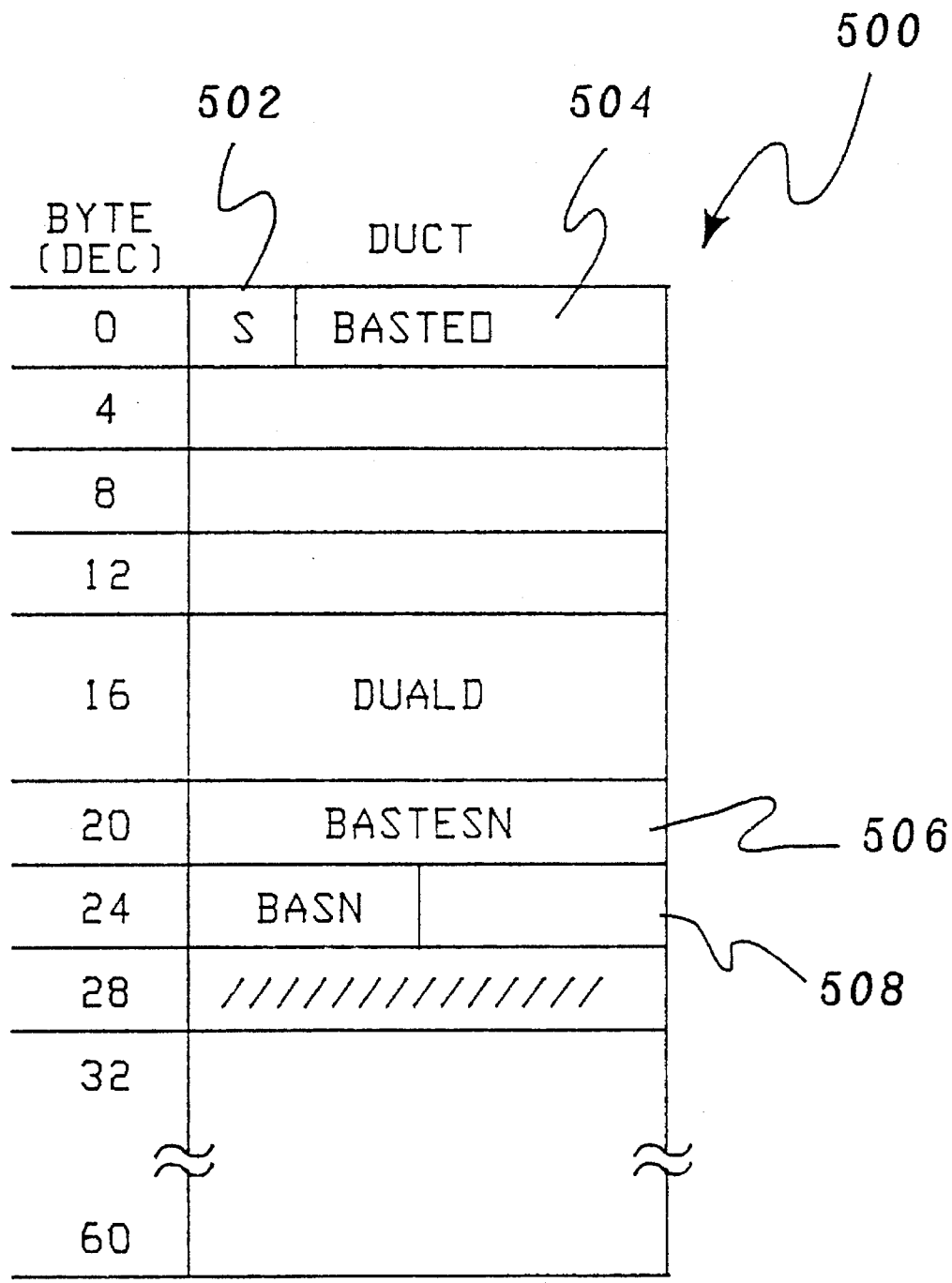
FIG. 5 depicts one example of a format of a dispatchable unit control table, in accordance with the principles of the present invention.

In accordance with the principles of the present invention, the parameters used in identifying the base space and retrieving the associated control information are located in a dispatchable unit control table (DUCT) 500 (FIG. 5). Each dispatchable unit or task control block has an associated DUCT and each DUCT resides in real storage. The beginning of DUCT 500 is specified by appending six zeros to a DUCT origin (DUCTO), which is located in bits 1-25 of control register 2. The format of DUCT 500, as altered in accordance with the principles of the present invention, is depicted in FIG. 5.

Referring to FIG. 5, DUCT 500 is, for instance, 64 bytes in length and includes the following fields, which have been added in accordance with the present invention: an "s" indicator 502, a BASTEO 504, a BASTESN 506 and a BASN 508, all of which are described further below.

"S" indicator 502 is stored in, for example, bit 0 of DUCT 500 and is used to indicate whether ASTE validation and ASTESN checking (described below) are to be performed.

BASTEO 504 is located in bits 1-25 of DUCT 500 and represents the origin of the address space number-second-table entry associated with the base. In one embodiment, six zeros are appended on the right of the BASTEO to form the 31-bit real address of the base address space number-second-table entry (BASTE).

BASTESN 506 is located in bits 160-191 of DUCT 500 and represents the base address space number-second-table-entry sequence number. When executing under, for example, MVS, the base address space is equal to the home address space and, thus, if a dispatchable unit is executing in the base space and a PROGRAM CALL to the base space is issued, the base address space (or the home address space) is necessarily available. This is true since if the base space (or home space) is terminated, the dispatchable unit is also terminated. However, in other systems, the base space may not be equivalent to the home space and thus, it is advantageous to determine whether the appropriate base space is still available before issuing the PROGRAM CALL to that base space (this is referred to herein as ASTE validation and ASTESN checking). BASTESN 506 along with "S" indicator 502 are used in this determination, as described further below.

BASN 508 is located in bits 192-207 of DUCT 500 and represents the base address space number. BASTEO 504, BASTESN 506 and BASN 508 are stored in the DUCT when the duct is created. For example, in MVS, the value of the home ASN is stored in BASN during, for example, ATTACH processing.

Figure 6:
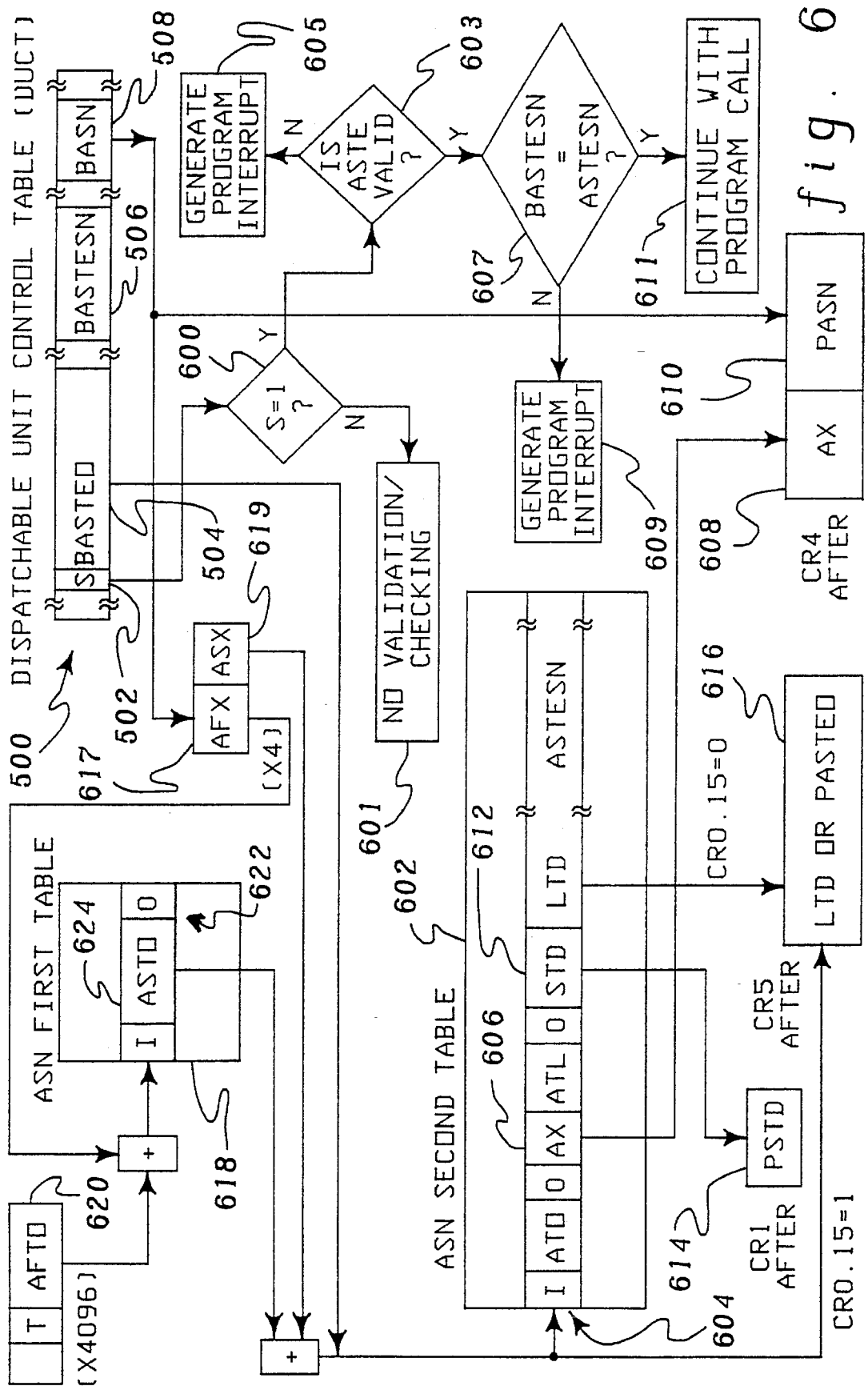
FIG. 6 is one example of a flow diagram for locating an ASTE during a PROGRAM CALL execution, in accordance with the present invention.

Referring to FIG. 6, the discussion of the execution of a PROGRAM CALL to a base space continues, in accordance with the principles of the present invention. As previously mentioned, in those systems wherein the base space is not equivalent to the home space it is advantageous to know whether the base space is still available before branching to the base space. Thus, "S" indicator 502 located in DUCT 500 is checked to see whether ASTE validation and ASTESN checking are to be performed, INQUIRY 600 "S=1?" If "S" is not equal to 1, then no ASTE validation or ASTESN checking is to be performed, STEP 601 "No Validation/Checking." If, on the other hand, "S" does equal 1, then an ASN-second-table index (ASX) invalid bit I (bit 0 of the ASTE) is checked to see if the ASTE is valid, INQUIRY 603 "Is ASTE Valid?" If invalid bit I is equal to 1 and thus, the ASTE is invalid, then a program interrupt is generated, STEP 605 "Generate Program Interrupt." Should the invalid bit be equal to 0 and therefore, the ASTE is valid, then ASTESN checking is performed. That is, BASTESN 506 is compared with the address space number-second-table entry sequence number (ASTESN) located in the ASTE, INQUIRY 607 "BASTESN=ASTESN?" and if they are unequal, then a program interrupt is generated, STEP 609 "Generate Program Interrupt." If BASTESN does equal ASTESN, then execution of the PROGRAM CALL continues, STEP 611 "Continue with Program Call."

In order to complete the execution of the PROGRAM CALL to the base space, it is necessary to identify the base space and to locate and access one or more base address space control parameters. In one preferred embodiment of the present invention, this is accomplished by retrieving one or more base address space parameters from the DUCT to be used in identifying the base space and accessing the associated control information located in an address space number-second-table (ASN-second table) 602.

In particular, in one example, BASTEO 504 is retrieved from DUCT 500 and six zeros are appended on the right of the BASTEO to form the real address used in obtaining an entry 604 (ASTE) of ASN-second table 602. The information provided at ASTE 604 is used in completing the PC-ss execution. In particular, an authorization index (AX) 606 of ASTE 604 and BASN 508 of DUCT 500 are placed in control register 4 at 608 (AX) and 610 (PASN), respectively. In addition, a segment table designation (STD) 612 of ASTE 604 is placed in control register 1 at 614 (PSTD). Further, since the method and system described herein is applicable in the ESA environment (CR 0.15=1), the real ASTE address is placed in control register 5 at 616 as the PASTEO.

Although the above technique for obtaining an entry in the ASN-second-table by using BASTEO 504 located in DUCT 500 is preferred, it is also possible to obtain the ASTE by deriving the real ASTE address through ASN translation. This is accomplished by dividing BASN 508 into an index (AFX) 617 into an ASN first table 618 and an index (ASX) 619 into ASN-second-table 602. Index 617 is added to an origin of the ASN first table (AFTO) 620 to provide the real address of an entry 622 in ASN first table 618. Entry 622 includes an ASN-second-table origin (ASTO) 624 which when joined with index 619 forms the real address used in obtaining ASTE 604. Once ASTE 604 is obtained by ASN translation, then the PROGRAM CALL execution is continued as described above.

Subsequent to performing all of the relevant steps for a PROGRAM CALL to a dispatchable unit's base space as depicted in FIGS. 2, 4 and 6 and described herein, the PROGRAM CALL execution of the present invention is complete.

Although preferred embodiments have been depicted and described in detail herein, it will be apparent to those skilled in the relevant art that various modifications, additions, substitutions and the like can be made without departing from the spirit of the invention, and these are therefore considered to be within the scope of the invention as recited in the appended claims.

What is claimed is:

1. A method for accessing an address space, said method comprising the steps of:

a) executing, via a program running under control of a work unit, a Program Call from an address space in which said program is running to a base address space of said work unit, said base address space to be identified during execution of said Program Call; and (b) retrieving, during execution of said Program Call, a parameter from a control table particularly associated with said work unit to identify said base address space being called: including retrieving said parameter from a dispatchable unit control table.

2. The method of claim 1, wherein said retrieved parameter comprises a base address space number.

3. The method of claim 1, further comprising the step of retrieving at least one additional parameter from said control table for accessing associated control information for the identified base address space, said at least one additional parameter comprising a base address space number-second-table entry origin used to locate an address space number-second-table entry comprising said associated control information.

4. The method of claim 3, further comprising the step of determining a continued availability of the base address space.

5. The method of claim 4, wherein said step of determining includes the steps of:

determining whether said address space number-second-table entry is valid; and comparing a base address space number-second-table entry sequence number with an address space number-second-table entry sequence number when said address space number-second-table entry is valid.

6. The method of claim 5, wherein said base address space number-second-table entry sequence number is stored in a dispatchable unit control table and wherein said address space number-second-table entry sequence number is stored in said address space number-second-table entry.

7. The method of claim 1, wherein said retrieved parameter comprises a base address space number and said method further comprises the step of:

performing an address space number translation using said base address space number to access associated control information for the identified base address space.

8. The method of claim 1, further comprising executing via a second program running under control of a second work unit a second Program Call to a base address space of said second work unit, said second Program Call having a same Program Call number as said Program Call of step (a), and wherein said base address space of said second work unit is different from said base address space of said work unit of step (a).

9. The method of claim 1, wherein said step of executing comprises checking an indicator to determine whether said base address space is to be accessed, and wherein said step of retrieving is performed when said indicator indicates said base address space is to be accessed.

10. The method of claim 9, wherein said indicator is located in an entry-table entry.

11. A system for accessing an address space, comprising:

means for executing, via a program running under control of a work unit, a Program Call from an address space in which said program is running to a base address space of said work unit, said base address space to be identified during execution of said Program Call; and means for retrieving, during execution of said Program Call, a parameter from a control table particularly associated with said work unit to identify said base address space being called, wherein said means for retrieving retrieves said parameter from a dispatchable unit control table.

12. The system of claim 11, wherein said retrieved parameter comprises a base address space number.

13. The system of claim 11, further comprising means for retrieving at least one additional parameter from said control table for accessing associated control information for the identified base address space, said at least one additional parameter comprising a base address space number-second-table entry origin used to locate an address space number-second-table entry comprising said associated control information.

14. The system of claim 13, further comprising means for determining a continued availability of the base address space.

15. The system of claim 14, wherein said means for determining includes:

means for determining whether said address space number-second-table entry is valid; and means for comparing a base address space number-second-table entry sequence number with an address space number-second-table entry sequence number when said address space number-second-table entry is valid.

16. The system of claim 15, wherein said base address space number-second-table entry sequence number is stored in a dispatchable unit control table and wherein said address space number-second-table entry sequence number is stored in said address space number-second-table entry.

17. The system of claim 11, wherein said retrieved parameter comprises a base address space number and said system further comprises means for performing an address space number translation using said base address space number to access associated control information for the identified base address space.

18. The system of claim 11, further comprising means for executing via a second program running under control of a second work unit a second Program Call to a base address space of said second work unit, said second Program Call having a same Program Call number as said Program Call, and wherein said base address space of said second work unit is different from said base address space of said work unit.

19. The system of claim 11, wherein said means for executing comprises means for checking an indicator to determine whether said base address space is to be accessed, and wherein said means for retrieving is performed when said indicator indicates said base address space is to be accessed.

20. The system of claim 19, wherein said indicator is located in an entry-table entry.

* * * * *